(12) United States Patent
Wilen et al.

(10) Patent No.: US 6,724,389 B1
(45) Date of Patent: Apr. 20, 2004

(54) MULTIPLEXING DIGITAL VIDEO OUT ON AN ACCELERATED GRAPHICS PORT INTERFACE

(75) Inventors: Adam H. Wilen, Folsome, CA (US); Marcus Grindstaff, Folsom, CA (US); Aditya Sreenivas, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 546 days.

(21) Appl. No.: 09/823,107

(22) Filed: Mar. 30, 2001

(51) Int. Cl.$^7$ ............................................... G06F 13/14
(52) U.S. Cl. ..................................... 345/520; 710/100
(58) Field of Search ................................. 345/501–503, 345/519, 520; 710/100, 301, 107, 305, 306, 309

(56) References Cited

U.S. PATENT DOCUMENTS 6,292,859 B1 * 9/2001 Santiago ..................... 710/107
6,321,287 B1 * 11/2001 Rao et al. .................... 710/260
6,532,019 B1 * 3/2003 Gulick et al. ................ 345/519
6,624,817 B1 * 9/2003 Langendorf .................. 345/520
6,630,936 B1 * 10/2003 Langendorf .................. 345/520

* cited by examiner

*Primary Examiner*—Kee M. Tung
(74) *Attorney, Agent, or Firm*—Blakely, Sokoloff, Taylor & Zafman LLP

(57) ABSTRACT

The present invention is a method and apparatus to map first graphics pins into second graphics pins. A first plurality of data and command pins corresponding to data and command signals in a first graphics mode is mapped into a second plurality of data and command pins corresponding to data and command signals in a second graphics mode. The first and second graphics modes are supported by a first chipset. The second graphics mode is supported by a second chipset. A detector pin strappable to a logic level to indicate an external graphics card is used in the first graphics mode is mapped into a first pin corresponding to a first signal of the second graphics mode. The first signal is ignored by the second chipset during initialization.

30 Claims, 8 Drawing Sheets

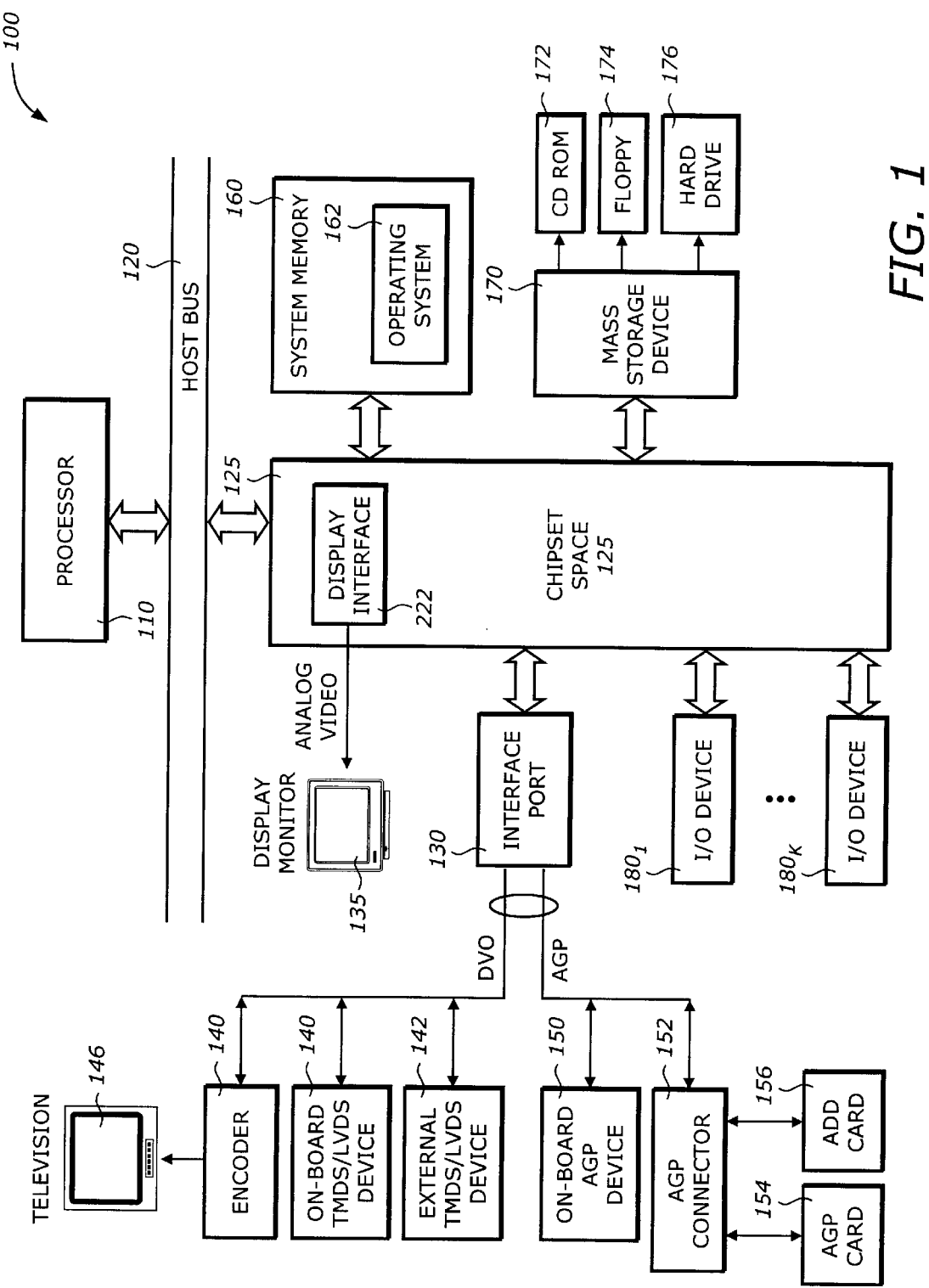

| PIN# | A | DVO SIGNAL NAME | PIN# | A | DVO SIGNAL NAME |
|---|---|---|---|---|---|
| 1 | 12V | | 34 | Vddq1.5 | |
| 2 | TYPEDET# | TYPEDET | 35 | AD22 | DVOC_D3 |
| 3 | RESERVED | | 36 | AD20 | DVOC_D1 |
| 4 | USB | | 37 | GND | |
| 5 | GND | | 38 | AD18 | DVOC_Blank# |
| 6 | INTA# | | 39 | AD16 | DVOC_Vsync |
| 7 | RST# | RST# | 40 | Vddq1.5 | |
| 8 | GNT# | | 41 | FRAME# | MDDC_Data |
| 9 | VCC3.3 | | 42 | | |
| 10 | ST1 | | 43 | | |
| 11 | RESERVED | | 44 | | |
| 12 | PIPE# | | 45 | | |
| 13 | GND | | 46 | TRDY# | MDDC_Clk |
| 14 | WBF# | | 47 | STOP | MX_Data |
| 15 | SBA1 | ADD_ID1 | 48 | PME# | |
| 16 | VCC3.3 | | 49 | GND | |
| 17 | SBA3 | ADD_ID3 | 50 | PAR | ADD_Detect |
| 18 | SB_STB# | | 51 | AD15 | MX_Clk |
| 19 | GND | | 52 | Vddq1.5 | |
| 20 | SBA5 | ADD_ID5 | 53 | AD13 | DVOBC_Clkint |
| 21 | SBA7 | ADD_ID7 | 54 | AD11 | DVOB_D11 |
| 22 | RESERVED | | 55 | GND | |
| 23 | GND | | 56 | AD9 | DVOB_D9 |
| 24 | RESERVED | | 57 | C/BE#0 | DVOB_D7 |
| 25 | VCC3.3 | | 58 | Vddq1.5 | |
| 26 | AD30 | DVOBC_Intr# | 59 | AD_STB0# | DVOB_CLK# |
| 27 | AD28 | DVOC_D11 | 60 | AD6 | DVOB_D5 |
| 28 | VCC3.3 | | 61 | GND | |
| 29 | AD26 | DVOC_D9 | 62 | AD4 | DVOB_D3 |
| 30 | AD24 | DVOC_D7 | 63 | AD2 | DVOB_D1 |
| 31 | GND | | 64 | Vddq1.5 | |
| 32 | AD_STB1# | DVOC_CLK# | 65 | AD0 | DVOB_Hsync |
| 33 | C/BE3# | DVOC_D5 | 66 | Vrefgc | |

*FIG. 4A*

| PIN# | B | DVO SIGNAL NAME | PIN# | B | DVO SIGNAL NAME |
|---|---|---|---|---|---|
| 1 | OVERCNT# | | 34 | Vddq1.5 | |
| 2 | 5.0V | | 35 | AD21 | DVOC_D2 |
| 3 | 5.0V | | 36 | AD19 | DVOC_D0 |
| 4 | USB+ | | 37 | GND | |
| 5 | GND | | 38 | AD17 | DVOC_Hsync |
| 6 | INTB# | | 39 | C/BE#2 | |
| 7 | CLK | | 40 | Vddq1.5 | |
| 8 | REQ# | | 41 | IRDY# | MI2C_Clk |
| 9 | VCC3.3 | | 42 | | |
| 10 | ST0 | | 43 | | |
| 11 | ST2 | | 44 | | |
| 12 | RBF# | | 45 | | |
| 13 | GND | | 46 | DEVSEL# | MI2C_data |
| 14 | RESERVED | | 47 | Vddq1.5 | |
| 15 | SBA0 | ADD_ID0 | 48 | PERR# | |
| 16 | VCC3.3 | | 49 | GND | |
| 17 | SBA2 | ADD_ID2 | 50 | SERR# | |
| 18 | SB_STB | | 51 | C/BE#1 | DVOB_Blank# |
| 19 | GND | | 52 | Vddq1.5 | |
| 20 | SBA4 | ADD_ID4 | 53 | AD14 | DVOB_Fld/Stl |
| 21 | SBA6 | ADD_ID6 | 54 | AD12 | DVOB_D10 |
| 22 | RESERVED | | 55 | GND | |
| 23 | GND | | 56 | AD10 | DVOB_D8 |
| 24 | 3.3Vaux | | 57 | AD8 | DVOB_D6 |
| 25 | VCC3.3 | | 58 | Vddq1.5 | |
| 26 | AD31 | DVOC_Fld/Stl | 59 | AD_STB0 | DVOB_CLK |
| 27 | AD29 | DVOC_D10 | 60 | AD7 | DVOB_D4 |
| 28 | VCC3.3 | | 61 | GND | |
| 29 | AD27 | DVOC_D8 | 62 | AD5 | DVOB_D2 |
| 30 | AD25 | DVOC_D6 | 63 | AD3 | DVOB_D0 |
| 31 | GND | | 64 | Vddq1.5 | |
| 32 | AD_STB1 | DVOC_CLK | 65 | AD1 | DVOB_Vsync |
| 33 | AD23 | DVOC_D4 | 66 | Vrefgc | |

*FIG. 4B*

MULTIPLEXING DIGITAL VIDEO OUT ON AN ACCELERATED GRAPHICS PORT INTERFACE

BACKGROUND

1. Field of the Invention

This invention relates to graphics. In particular, the invention relates to graphics port interface.

2. Background of the Invention

A typical graphics display system may have a number of graphics capabilities. An integrated chipset may have internal graphics controller and interface to an external graphic device via a graphics port. Depending on system requirements and platform, a user may select whether the internal graphics controller or the external graphic device is used. To provide flexibility for board manufacturers or Original Equipment Manufacturers (OEM's) in designing graphics-based systems, it is desirable to have an efficient mechanism to select the desired graphics capability. However, since the signal definitions for the internal graphics controller are usually different than those of the interface graphics port for external devices, it is a design challenge to provide this selection mechanism.

One technique for the selection of the desired graphics capability is to provide two sets of guidelines: one set for the internal graphics controller and another set for the external device. This technique creates complexity in board designs and incur additional software overhead for configuration and initialization.

BRIEF DESCRIPTION OF THE DRAWINGS

The features and advantages of the present invention will become apparent from the following detailed description of the present invention in which:

FIG. 1 is a diagram illustrating a system in which one embodiment of the invention can be practiced.

FIG. 4A is a diagram illustrating pin assignment on side A of the interface port for the DVO and AGP modes according to one embodiment of the invention.

FIG. 4B is a diagram illustrating pin assignment on side B of the interface port for the DVO and AGP modes according to one embodiment of the invention.

DETAILED DESCRIPTION OF THE INVENTION

Figure 2A:
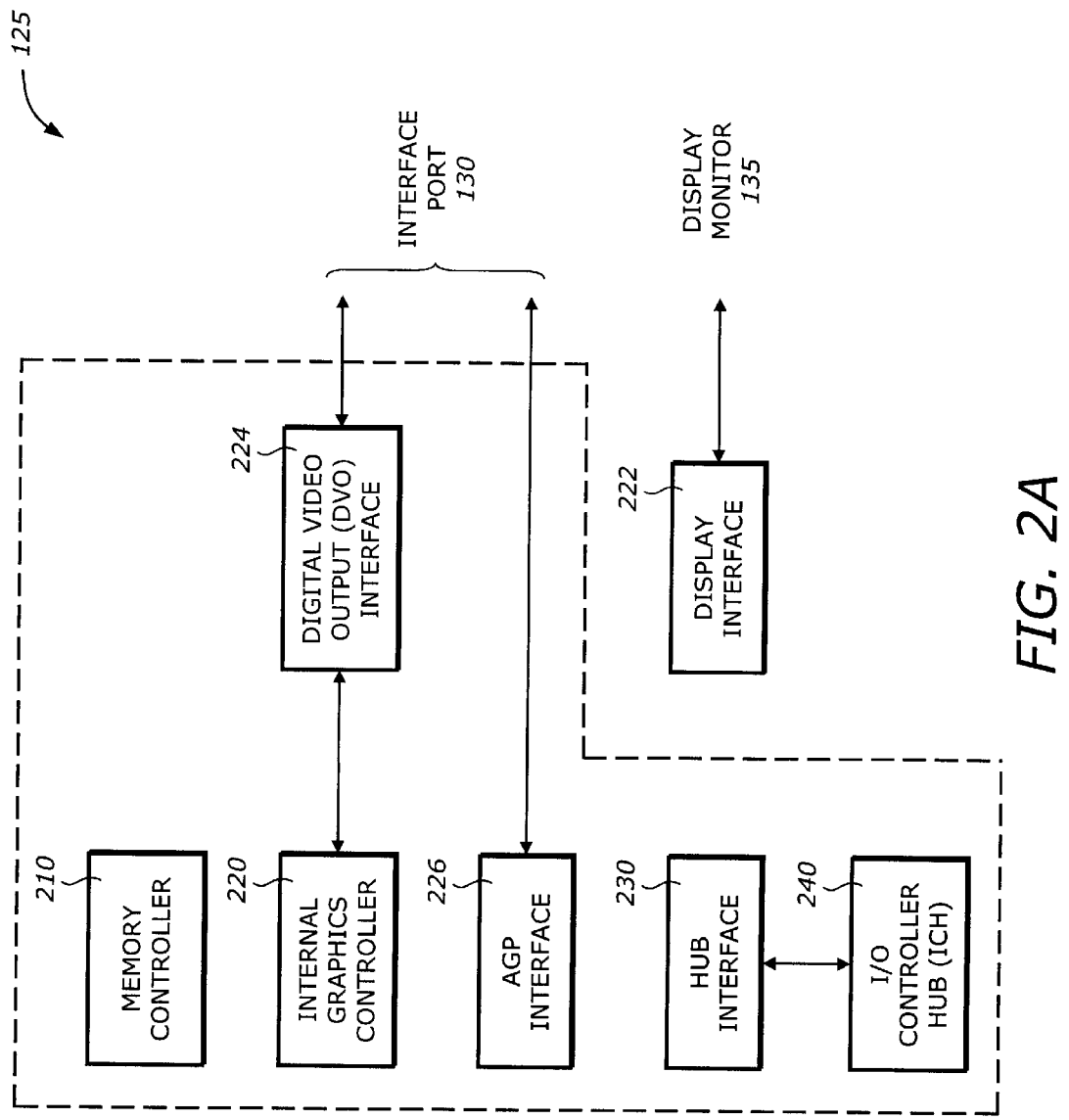
FIG. 2A is a diagram illustrating an integrated chipset located in the chipset space 125 shown in FIG. 1 according to one embodiment of the invention.

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention. For examples, although the description of the invention is directed to the digital video output (DVO) and accelerated graphics port (AGP) graphics modes, the invention can be practiced for other graphics modes having similar characteristics. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

FIG. 1 is a diagram illustrating a computer system 100 in which one embodiment of the invention can be practiced. The computer system 100 includes a processor 110, a host bus 120, a chipset space 125, an interface port 130, an on-board digital video output (DVO) device 140, an external DVO device 142, an encoder 144, a television set 146, an on-board accelerated graphics port (AGP) device 150, an AGP connector 152, an external AGP device 154, an AGP digital display (ADD) card 156, a system memory 160, a mass storage device 170, and input/output devices $180_1$ to $180_K$. Note that not all of these devices are present in a typical system. In some cases, the presence of a device precludes another device. For example, if an on-board device is present, an external similar device is not needed.

The processor 110 represents a central processing unit of any type of architecture, such as embedded processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture. In one embodiment, the processor 110 is compatible with the Intel Architecture (IA) processor, such as the IA-32 and the IA-64. The host bus 120 provides interface signals to allow the processor 110 to communicate with other processors or devices, e.g., the memory controller hub (MCH) 130. The host bus 120 may support a uni-processor or multiprocessor configuration. The host bus 120 may be parallel, sequential, pipelined, asynchronous, synchronous, or any combination thereof.

The chipset space 125 is a space to receive one or more chipsets. The chipset(s) to be plugged into the chipset space 125 may be an integrated chipset or chipsets with separate functionalities. The integrated chipset may have functionalities equivalent to a memory controller, a graphics controller, and an input/output (I/O) controller. The separate chipsets may include a memory controller chipset and an I/O controller chipset. The invention provides a mechanism to maintain compatibility with various configurations for the chipset space 125.

The interface port 130 provides connection pins to interface to a number of devices. The interface port 130 includes multiplexed pins to support at least two graphics modes. In one embodiment, these graphics mode includes a DVO mode and an AGP mode. The DVO mode may include a digital visual interface (DVI) which supports transition minimized differential signal (TMDS) or low voltage differential signaling (LVDS) devices. By having a common interface port for both graphics signals used in the two graphics modes, a significant saving in hardware and software can be realized. In addition, the single interface port 130 provides a single set of guidelines which facilitates the design of add-on devices or cards. Alternatively, the interface port 130 may provide a set of guidelines and other devices or cards may follow another set of guidelines.

The on-board and external TMDS/LVDS devices 140 and 142 are graphic devices that interface to the DVO signaling from the interface port 130. The on-board TMDS/LVDS device 140 is located on the motherboard containing the processor 110 while the external TMDS/LVDS device 142 is an add-on card to be plugged into a slot having interface to the interface port 130. The TMDS/LVDS devices 140 and 142 drive a flat panel display or a digital display monitor through a TMDS/LVDS transmitter. The encoder 144 encodes the digital pixel data generated by the graphics controller from the chipset at the chipset space 125 into a usable video signal. The television set 146 receives the video signal from the encoder 144 in a suitable format such as National Television System Committee (NTSC), phase alternation by line (PAL), or sequential technique and memory storage (SECAM) and displays the graphics information.

The on-board AGP device 150 is a graphic device that is compatible to the AGP standard such as the AGP Version 2.0 Standard (published in "Accelerated Graphics Port Interface Specification" Revision 2.0 by Intel Corporation, May 4, 1998). The on-board AGP device 150 interfaces directly to the interface port 130 and is located on the motherboard that contains the processor 110. The AGP connector 152 is a connector that supports the AGP standard (e.g., version 2.0). The external AGP device 154 is an add-on AGP-compatible graphics device located externally to the motherboard. The ADD card 156 is a graphics device that interfaces to the AGP connector 152 and is compatible to the DVO mode. The ADD card 156 may support a 12-bit or 24-bit, 1.5 v signaling compliant DVO device.

The system memory 160 stores system code and data. The system memory 160 is typically implemented with dynamic random access memory (DRAM) or static random access memory (SRAM). The system memory may include an operating system, device drivers, and software to initialize or configure the various graphics modes. The system memory 140 may also include other programs or data, which are not shown depending on the various embodiments of the invention.

The mass storage device 170 stores archive information such as code, programs, files, data, applications, and operating systems. The mass storage device 170 may include compact disk (CD) ROM 172, floppy diskettes 174, and hard drive 176, and any other magnetic or optic storage devices. The mass storage device 170 provides a mechanism to read machine-readable media.

The I/O devices $180_1$ to $180_K$ may include any I/O devices to perform I/O functions. Examples of I/O devices $180_1$ to $180_K$ include controllers for input devices (e.g., keyboard, mouse, trackball, pointing device), media cards (e.g., audio, video, graphics), network cards, and any other peripheral controllers.

FIG. 2A is a diagram illustrating an integrated chipset 205 located in the chipset space 125 shown in FIG. 1 according to one embodiment of the invention. The chipset space 125 is occupied by the integrated chipset 205. The integrated chipset 205 is a graphics and memory controller hub (GMCH).

The integrated chipset 205 includes a memory controller 210, an internal graphics controller 220, a hub interface 230, and an optional Input/Output controller hub (ICH) 240.

The memory controller 210 controls the system memory 140 (FIG. 1). The internal graphics controller 220 is a graphics engine that can perform a number of graphics operations. In one embodiment, the internal graphics controller 220 provides shading, filtering, clipping, and three-dimensional (3-D) transformations. The internal graphics controller 220 operates in parallel or works in conjunction with the AGP controller. The internal graphics controller 220 provides a display interface 222 and a DVO interface 224. The display interface 222 generates synchronization signals such as vertical sync and horizontal sync, red green blue (RGB) color information, and other video signals to drive an analog video display monitor. The DVO interface 224 generates DVO data and clock signals for DVO devices, and the display control signals (e.g., M12C) which may be used to drive flat panel display. The AGP interface 226 generates AGP-compatible signals for use in the AGP mode. The AGP interface 226 provides an upgrade path for graphics capability if the internal graphics controller 220 is not sufficient. The hub interface 230 provides interface signals to the ICH 240. The ICH 240 may be integrated within the chipset 205 or may be located externally to the chipset 205. The ICH 240 has a number of functionalities that are designed to support I/O functions. The ICH 240 may include a number of interface and I/O functions such as PCI bus interface, processor interface, interrupt controller, direct memory access (DMA) controller, power management logic, timer, universal serial bus (USB) interface, mass storage interface, low pin count (LPC) interface, etc. The ICH 240 includes a mass storage controller to control the mass storage device 170 (FIG. 1). It is contemplated that the system 100 may also include peripheral buses such as Peripheral Component Interconnect (PCI), accelerated graphics port (AGP), Industry Standard Architecture (ISA) bus, and Universal Serial Bus (USB), etc.

In many systems that use the integrated chipset 205, the AGP connector 152 (FIG. 1) is linked to the AGP interface 226 to provide a graphics upgrade path. When the AGP connector 152 is not populated with an external AGP device (e.g., the external AGP card 154 in FIG. 1), it is possible to make use of the multiplexed digital display channels via the ADD card 156. The ADD card 156 is plugged into the AGP connector 152 but has digital display devices that use the multiplexed digital display channels. Alternatively, DVO devices may be soldered down on the motherboard containing the processor 110.

Figure 2B:
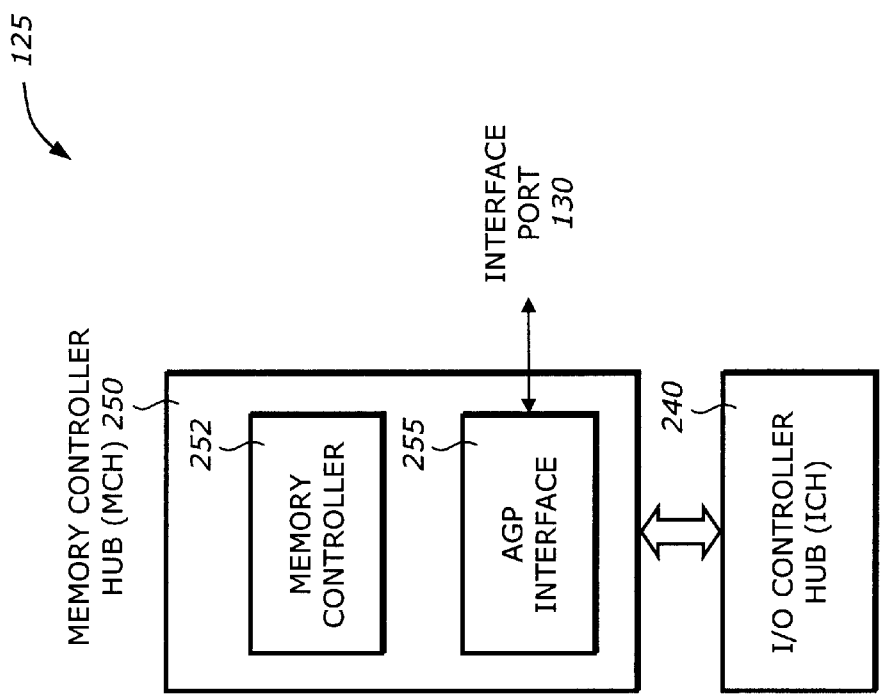
FIG. 2B is a diagram illustrating separate chipsets located in the chipset space 125 shown in FIG. 1 according to one embodiment of the invention.

FIG. 2B is a diagram illustrating separate chipsets located in the chipset space 125 shown in FIG. 1 according to one embodiment of the invention. The chipset space 125 is occupied by a memory controller hub 250 and the ICH 240.

The MCH 250 includes a memory controller 252 and an AGP interface 255. The memory controller 252 performs similar functions as the memory controller 210 shown in FIG. 2A. The AGP interface 255 provides AGP-compatible signals for AGP modes. The MCH 250 does not have an internal graphics controller that supports the DVO mode. The ICH 240 is described above.

Since the MCH 250 does not have an internal graphics controller, it can only support the AGP mode. The interface port 130 can be used for either DVO or AGP modes. The interface port 130 can be used with the MCH 250 when the system is configured to operate in a suitable mode.

Within an AGP-only interface, the signals are divided into several categories: 1x timing domain and 2x/4x timing domain. There are three sets of signals acting as sub-groups within the 2x/4x domain. A DVO interface has several similar characteristics when compared to an AGP interface, especially an AGP interface that runs in the 4x mode. The interface port 130 provides an optimized method to multiplex the DVO signals on an AGP interface. This method focuses on the similarities of the two graphics signals and masks off the differences.

Figure 3A:
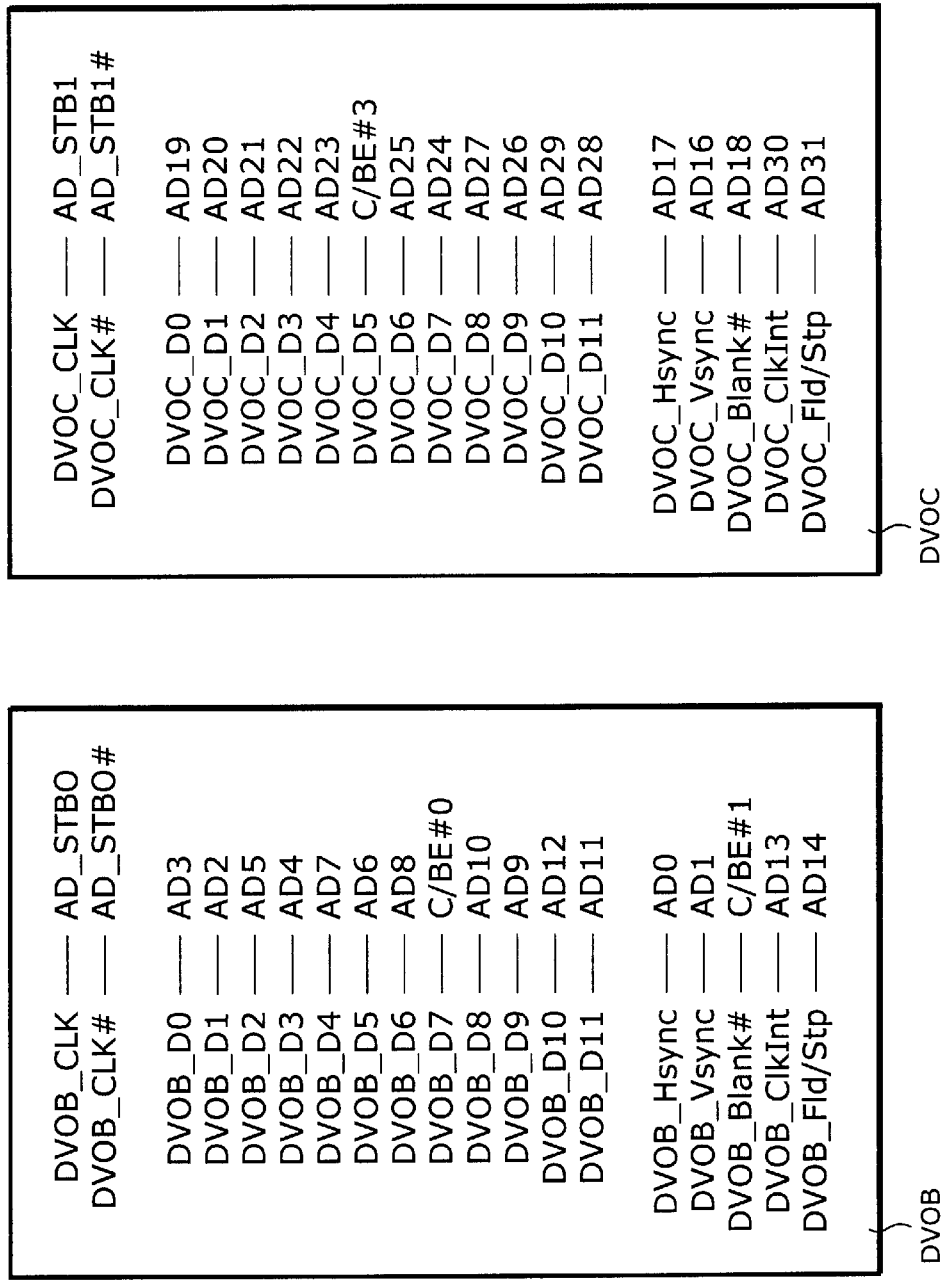
FIG. 3A is a diagram illustrating mapping of data and command signals for the DVO and AGP modes on the interface port according to one embodiment of the invention.

FIG. 3A is a diagram illustrating mapping of data and command signals for the DVO and AGP modes on the interface port according to one embodiment of the invention.

The DVO mode supports two DVO ports, DVOB and DVOC, multiplexed on the AGP interface. Each of the ports can be configured as a 12-bit TV-out port or a 12-bit digital-out port. The two ports can be combined to enable 24-bit digital out to support high-resolution digital display. The DVOB data signals include DVOB_D0 to DVOB_D11 and the DVOB command signals include DVOB_Hsync, DVOB_Vsync, DVOB_Blank, DVOBC_Clk_Int, and DVOB_Fld/Stl. The DVOC data signals include DVOC_D0 to DVOC_D11 and the DVOC command signals include DVOC_Hsync, DVOC_Vsync, DVOC_Blank, DVOBC_Clk_Int, and DVOC_Fld/Stl. These signals are mapped or multiplexed on the AGP data and command signals. Since the data and command signals on the DVO and the AGP have similar characteristics, multiplexing the data and command signals of the DVO mode into the data and command signals of the AGP mode leads to the same design guidelines, simplifying board design work.

The mapping of the DVOB signals to the AGP signals is as follows:

| DVOB_D0 | to | AD3 |
|---|---|---|
| DVOB_D1 | to | AD2 |
| DVOB_D2 | to | AD5 |
| DVOB_D3 | to | AD4 |
| DVOB_D4 | to | AD7 |
| DVOB_D5 | to | AD6 |
| DVOB_D6 | to | AD8 |
| DVOB_D7 | to | C/BE#0 |
| DVOB_D8 | to | AD10 |
| DVOB_D9 | to | AD9 |
| DVOB_D10 | to | AD12 |
| DVOB_D11 | to | AD11 |
| DVOB_Hsync | to | AD0 |
| DVOB_Vsync | to | AD1 |
| DVOB_Blank | to | C/BE#1 |
| DVOBC_Clk_Int | to | AD13 |
| DVOB_Fld/Stl | to | AD14 |

The mapping of the DVOC signals to the AGP signals is as follows:

| DVOC_D0 | to | AD19 |
|---|---|---|
| DVOC_D1 | to | AD20 |
| DVOC_D2 | to | AD21 |
| DVOC_D3 | to | AD22 |
| DVOC_D4 | to | AD23 |
| DVOC_D5 | to | C/BE#2 |
| DVOC_D6 | to | AD25 |
| DVOC_D7 | to | AD24 |
| DVOC_D8 | to | AD27 |
| DVOC_D9 | to | AD26 |
| DVOC_D10 | to | AD29 |
| DVOC_D11 | to | AD28 |
| DVOC_Hsync | to | AD17 |
| DVOC_Vsync | to | AD16 |
| DVOC_Blank | to | AD18 |
| DVOBC_Clk_Int | to | AD30 |
| DVOC_Fld/Stl | to | AD31 |

Figure 3B:
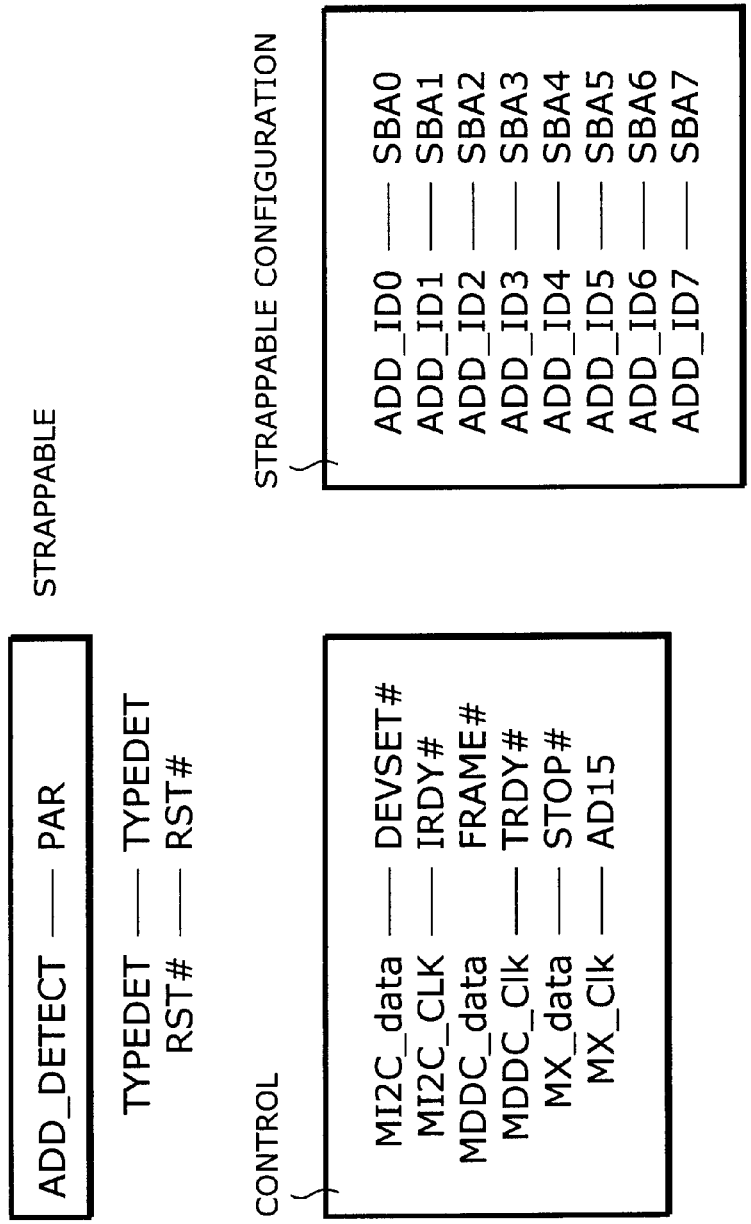
FIG. 3B is a diagram illustrating mapping of other signals for the DVO and AGP modes on the interface port according to one embodiment of the invention.

FIG. 3B is a diagram illustrating mapping of other signals for the DVO and AGP modes and miscellaneous signals on the interface port according to one embodiment of the invention.

The other signals for the DVO mode include a detector signal (ADD_Detect), DVO clock signals (DVOB_CLK, DVOB_CLK#, DVOC_CLK, and DVOC_CLK#), display control signals (MI2C_data, MI2C_Clk, MDDC_data, MDDC_Clk, MX_data, and MX_Clk), and ADD configuration signals (ADD_ID0 to ADD_ID7). The miscellaneous signals include a type detect (TYPEDET) signal and a reset (RST#) signals.

The mapping of these signals to the AGP signals is as follows:

| ADD_Detect | to | PAR |
|---|---|---|
| DVOB_CLK | to | AD_STB0 |
| DVOB_CLK# | to | AD_STB0# |
| DVOC_CLK | to | AD_STB1 |
| DVOC_CLK# | to | AD_STB1# |
| TYPEDET | to | TYPEDET# |
| RST# | to | RST# |
| MI2C_data | to | DEVSEL# |
| MI2C_Clk | to | IRDY# |
| MDDC_data | to | FRAME# |
| MDDC_Clk | to | TRDY# |
| MX_data | to | STOP# |
| MX_Clk | to | AD15 |
| ADD_ID0 | to | SBA0 |
| ADD_ID1 | to | SBA1 |
| ADD_ID2 | to | SBA2 |
| ADD_ID3 | to | SBA3 |
| ADD_ID4 | to | SBA4 |
| ADD_ID5 | to | SBA5 |
| ADD_ID6 | to | SBA6 |
| ADD_ID7 | to | SBA7 |

The ADD_Detect signal is used to identify that the ADD card 156 (FIG. 1) is used instead of the AGP card 154. The PAR signal of the AGP mode has fairly loose requirement according to the AGP Specification 2.0. The system 100 using the integrated chipset 205 does not violate the AGP specification if the PAR signal is at a HIGH logic level at reset. One way to do this is to use a pull-up resistor at the PAR signal. In one embodiment, this pull-up resistor has a value of approximately 8.2KΩ. To indicate that an ADD card is used, the ADD card pulls this signal LOW. When this occurs, the integrated chipset 205 disables the PCI configuration register #1 (host to AGP bridge). This causes the integrated chipset to behave as if it had no AGP interface and will not attempt to initialize the AGP mode. A system that does not use the integrated chipset 205 and uses a MCH only will ignore the ADD card 156 according to the AGP Specification 2.0.

The configuration signals ADD_ID0 to ADD_ID7 are strapped to high or low depending on the configuration of the ADD card 156. These signals are mapped or multiplexed onto the AGP SBA0 to SBA7, respectively. Since the SBA signals are meant to be input only to the MCH the AGP mode, these signals are not driven. Therefore, no initialization lockup will occur if the ADD card 156 is used in a system that does not use the integrated chipset 205.

The display control signals (e.g., the MI2C_data, MI2C_Clk, MDDC_data, MDDC_Clk, MX_data, and MX_Clk signals) are low frequency signals, typically operating at lower than 400 Khz. Therefore, mapping these signals to the low frequency signals of the AGP mode maintains the same design guidelines for both graphics modes. The miscellaneous signals (e.g., TYPEDET, RST#) are for compatibility with AGP specification.

FIG. 4A is a diagram illustrating the pin assignment on side A of the interface port for the DVO and AGP modes according to one embodiment of the invention.

FIG. 4B is a diagram illustrating the pin assignment on side B of the interface port for the DVO and AGP modes according to one embodiment of the invention.

Figure 5:
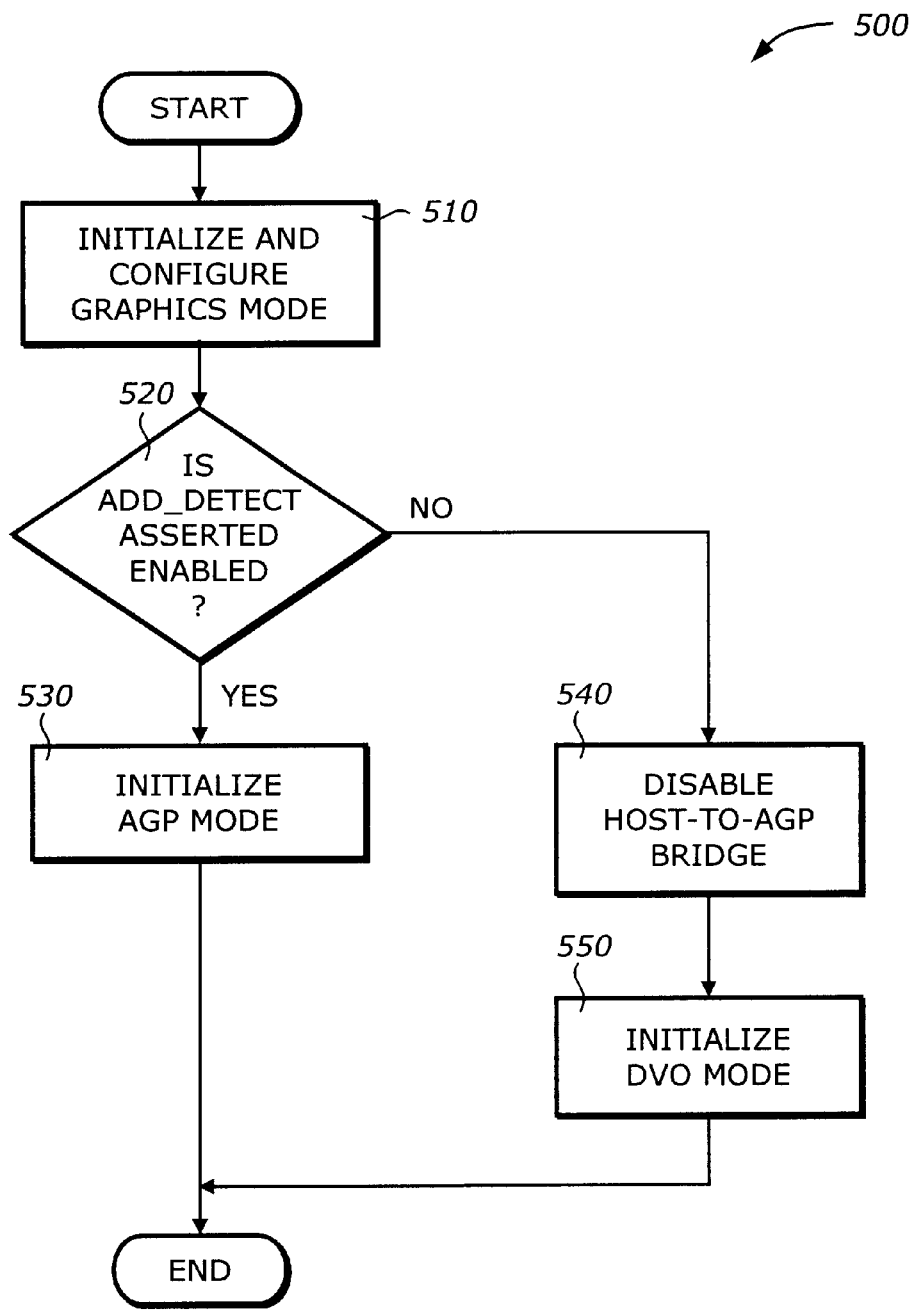
FIG. 5 is a flowchart illustrating a process to configure the graphics mode according to one embodiment of the invention.

FIG. 5 is a flowchart illustrating a process 500 to configure the graphics mode according to one embodiment of the invention.

Upon START, the process 500 initializes and configures the appropriate graphics mode (Block 510). Then, the process 500 determines if the ADD_Detect signal is enabled (Block 520). A LOW level on the ADD_Detect signal indicates that the ADD card is enabled via the AGP. If ADD_Detect is enabled, the process 500 initializes the AGP mode and is then terminated. Otherwise, the process 500 disables the host processor to AGP bridge (Block 540). Next, the process 500 initializes the DVO mode (Block 550) and is then terminated.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An interface port comprising:
    a first plurality of data and command pins corresponding to data and command signals in a first graphics mode, the first plurality of data and command pins being mapped into a second plurality of data and command pins corresponding to data and command signals in a second graphics mode, the first and second graphics modes being supported by a first chipset, the second graphics mode being supported by a second chipset; and
    a detector pin strappable to a logic level to indicate an external card is used in the first graphics mode, the detector pin being mapped into a first pin corresponding to a first signal of the second graphics mode, the first signal being ignored by the second chipset during initialization.

2. The interface port claim 1 further comprising:
    a plurality of configuration pins to configure the external card in the first graphics mode, the configuration pins being mapped into input pins corresponding to input signals of the second graphics mode.

3. The interface port of claim 1 further comprising:
    a plurality of display control pins corresponding to display control signals in the first graphics mode, the display control pins being mapped into low frequency pins corresponding low frequency signals in the second graphics mode; and
    a plurality of clock pins corresponding to clock signals in the first graphics mode, the clock pins being mapped into strobe pins corresponding to strobe signals in the second graphics mode.

4. The interface port of claim 3 wherein the first graphics mode is a digital video output (DVO) mode.

5. The interface port of claim 4 wherein the second graphics mode is an accelerated graphics port (AGP).

6. The interface port of claim 5 wherein the first signal is the parity signal in the AGP.

7. The interface port of claim 5 wherein the external card is an AGP digital display card (ADD).

8. The interface port of claim 5 wherein the input signals are side-band addressing (SBA) signals.

9. The interface port of claim 1 wherein the first chipset has an internal graphics controller.

10. The interface port of claim 1 wherein the second chipset has no internal graphics controller.

11. A method comprising:
    mapping a first plurality of data and command pins corresponding to data and command signals in a first graphics mode into a second plurality of data and command pins corresponding to data and command signals in a second graphics mode, the first and second graphics modes being supported by a first chipset, the second graphics mode being supported by a second chipset; and
    mapping a detector pin strappable to a logic level to indicate an external card is used in the first graphics mode into a first pin corresponding to a first signal of the second graphics mode, the first signal being ignored by the second chipset during initialization.

12. The method claim 11 further comprising:
    mapping a plurality of configuration pins to configure the external card in the first graphics mode into input pins corresponding to input signals of the second graphics mode.

13. The method of claim 11 further comprising:
    mapping a plurality of display control pins corresponding to display control signals in the first graphics mode into low frequency pins corresponding low frequency signals in the second graphics mode; and
    mapping a plurality of clock pins corresponding to clock signals in the first graphics mode into strobe pins corresponding to strobe signals in the second graphics mode.

14. The method of claim 13 wherein the first graphics mode is a digital video output (DVO) mode.

15. The method of claim 14 wherein the second graphics mode is an accelerated graphics port (AGP).

16. The method of claim 15 wherein the first signal is the parity signal in the AGP.

17. The method of claim 15 wherein the external card is an AGP digital display card (ADD).

18. The method of claim 15 wherein the input signals are side-band addressing (SBA) signals.

19. The method of claim 11 wherein the first chipset has an internal graphics controller.

20. The method of claim 11 wherein the second chipset has no internal graphics controller.

21. A system comprising:
    a chipset space to receive one of first and second chipsets, the first chipset supporting first and second graphics modes, the second chipset supporting second graphics mode; and
    an interface port coupled to one of the first and second chipsets, the interface port comprising:
        a first plurality of data and command pins corresponding to data and command signals in the first graphics mode, the first plurality of data and command pins being mapped into a second plurality of data and command pins corresponding to data and command signals in the second graphics mode, and a detector pin strappable to a logic level to indicate an external card is used in the first graphics mode, the detector pin being mapped into a first pin corresponding to a first signal of the second graphics mode, the first signal being ignored by the second chipset during initialization.

22. The system claim 21 wherein the interface port further comprises:

a plurality of configuration pins to configure the external graphics card in the first graphics mode, the configuration pins being mapped into input pins corresponding to input signals of the second graphics mode.

23. The system of claim 21 wherein the interface port further comprises:

a plurality of display control pins corresponding to display control signals in the first graphics mode, the display control pins being mapped into low frequency pins corresponding low frequency signals in the second graphics mode; and a plurality of clock pins corresponding to clock signals in the first graphics mode, the clock pins being mapped into strobe pins corresponding to strobe signals in the second graphics mode.

24. The system of claim 23 wherein the first graphics mode is a digital video output (DVO) mode.

25. The system of claim 24 wherein the second graphics mode is an accelerated graphics port (AGP).

26. The system of claim 25 wherein the first signal is the parity signal in the AGP.

27. The system of claim 25 wherein the external card is an AGP digital display card (ADD).

28. The system of claim 5, wherein the input signals are side-band addressing (SBA) signals.

29. The system of claim 21 wherein the first chipset has an internal graphics controller.

30. The system of claim 21 wherein the second chipset has no internal graphics controller.

* * * * *